United States Patent Office 3,830,751
Patented Aug. 20, 1974

3,830,751
NOVEL SILICATE CONTAINING STABILIZERS AND RIGID HALOGEN-CONTAINING RESIN COMPOSITIONS STABILIZED THEREWITH
Christian H. Stapfer, Newtown, Pa., and William B. Racz, Highland Park, N.J., assignors to Cincinnati Milacron Chemicals, Inc., Reading, Ohio
No Drawing. Filed Feb. 25, 1971, Ser. No. 118,966
Int. Cl. B01j 1/16; C08f 45/62
U.S. Cl. 252—400 R                      11 Claims

ABSTRACT OF THE DISCLOSURE

Halogen-containing resin compositions containing an admixture of a stabilizer and a synthetic silicate powder exhibit improved stability and processability.

---

This invention relates to stabilizers for halogen containing resins, resins stabilized therewith and methods of stabilizing halogen-containing resins. More particularly, this invention relates to stabilizers suspended on synthetic silicates, polyvinyl halide resins containing the same and methods of stabilizing rigid polyvinyl halide resins.

In the blending of polyvinyl halide formulations, the stabilizer is usually incorporated as a liquid or in molten form with vigorous agitation. The performance of the stabilizer during processing of the polymer will depend, among other things, upon its rate of diffusion through the polymer and its effective dispersion during the blending operation.

The influence of rheological properties on the heat stability of rigid polyvinyl chloride formulations is considerable and has been the object of many investigations. These rheological properties are best studied by means of a torque rheometer consisting of a miniature mixer and a torque meter which measures the load on the mixer. The mixing forces developed within a sample of material at a certain temperature cause a deflection of a recording dynamometer. The deflection is recorded on a strip chart. This torque (expressed in meter-grams) is directly related to the viscosity of the melt being mixed. When a polymer of the vinyl type degrades, it cross-links rapidly and shows a sharp rise in its melt viscosity. The time for this to occur is a measure of the thermal stability under dynamic shear conditions.

A typical torque rheometer curve provides one skilled in the art with information as to the melting, the fusion, the flow and the cross-linking in the processing of the polymer tested.

Torque rheometer data has been evaluated by mathematical rheological interpretations and by rather simple pragmatic interpretations. The latter interpretations allow generalizations of various phenomena and relate the generalization to processability of the polymer melt tested. The post fusion torque determined by rheometric testing is an extremely revealing value. Since post fusion torque is measured after the blend has melted, the value is controlled by the melt viscosity which is affected by internal and external lubricity. The viscosity of the melt has a substantial bearing on the effective stability of a given formulation, since melts with higher viscosities develop more heat during processing and consequently require the stability of the formulation to be greater than that of well plasticized and lubricated formulations which have low melt viscosities. Long term heat stability is generally evaluated in the time, in minutes, elapsed between the moment when the sample is placed under dynamic shear and the moment the post fusion torque increases from the minimum value reached during the stable mixing.

We have found that improved long term heat stability and processability of halogenated resins and particularly rigid polyvinyl chloride formulations are obtained when the stabilizer of the resin formulation is incorporated in admixture with synthetic silicate powders. Suitable silicate powders preferably have a combination of properties such as low bulk density, high absorptive capacity, varied particle size and shape and a high surface area. Their chemical constitution may vary as follows: 40–70% silica ($SiO_2$); 1 to 30% lime (CaO); 1 to 5% alumina ($Al_2O_3$); 1 to 2% iron oxide ($Fe_2O_3$); 0.1 to 20% magnesia (MgO); 1 to 2% alkalies ($Na_2O+K_2O$) and 10 to 20% volatile matter. The particle size of the synthetic silicate powders usually ranges from 1 to 100 microns and the preferred range is between 20 and 50 microns. The absorptive properties exhibited by the synthetic silicate powders appear to be a very important property to the present invention. We have observed that natural silicates such as diatomaceous earth, do not possess the necessary ability to absorb to be useful in practicing the present invention. The retention capacity of the synthetic silicates allows absorption of stabilizers up to 300% by weight based on the silicates. Synthetic silicate powders which will absorb at least 10% by weight of the stabilizer must be used and about 50% to 500% is preferred. Attempts to substitute a natural silicate powder in an admixture with the stabilizer for the synthetic silicate do not produce the improved results obtained when the synthetic silicates are used. The stabilizing admixtures of the present invention are prepared by simply blending the silicate powder with the stabilizer by any conventional means. The silicate powder and the stabilizer may be simultaneously introduced to a mixing vessel, or one may be introduced into the other. The simultaneous introduction of the silicate powder and stabilizer is preferred, since it lends itself best to a continuous operation.

The stabilizer admixtures of the present invention can be used with halogen containing vinyl and vinylidene resins in which the halogen is attached directly to a carbon atom in the polymer chain. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27% chlorine by weight, polyvinyl chloride, polyvinylidene chloride, polyvinyl bromide, polyvinyl fluoride, copolymers of vinyl chloride with 1 to 90%, preferably 1 to 30% of a copolymerizable etheylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichlorethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloracrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-2-ethylhexyl acrylate (80:20).

The stabilizer admixtures of the present invention can be incorporated with the resin by admixing in an appropriate mill or mixer or by any of the other well-known methods which provide for uniform distribution throughout the resin compositions. Thus, mixing can be accomplished by milling on rolls at 100–160° C.

The improved stability obtained by the stabilizer admixtures of the present invention is more evident in rigid formulations and becomes less noticeable as the plasticization and/or lubricity increases. Therefore, the resin formulations improved by the stabilizer admixtures of the present invention are those containing less than 2 weight percent of a plasticizer or lubricant and preferably less than 0.5 weight percent.

The following list of stabilizing compounds are suitable for practicing the present invention. While many of the compounds listed are poor stabilizers alone, they may be used in combinations which exhibit synergism that are further improved by the present invention.

STANNOIC ACIDS

Methyl stannoic acid, propyl stannoic acid, butyl, stannoic acid, isobutyl stannoic acid, octyl stannoic acid, 2-ethylhexyl stannoic acid, allyl stannoic acid, vinyl stannoic acid phenyl stannoic acid, cyclohexyl stannoic acid, cyclophentyl stannoic acid, p-tolyl stannoic acid, p-butylphenyl stannoic acid, and benzyl stannoic acid.

THIOSTANNOIC ACIDS

Methyl thiostannoic acid, propyl thiostannoic acid, butyl thiostannoic acid, isobutyl thiostannoic acid, octyl thiostannoic acid, 2-ethylhexyl thiostannoic acid, allyl thiostannoic acid, vinyl thiostannoic acid, phenyl thiostannoic acid, cyclohexyl thiostannoic acid, cyclopentyl thiostannoic acid, p-tolyl thiostannoic acid, p-butylphenyl thiostannoic acid, and benzyl thiostannoic acid.

ORGANOTIN OXIDES

Methyltin oxide, butyltin oxide, octyltin oxide, cyclohexyltin oxide, phenyltin oxide, allyltin oxide, dimethyltin oxide, dibutyltin oxide, dioctyltin oxide, diisooctyltin oxide, dicyclohexyltin oxide, diphenyltin oxide, diallyltin oxide, bis (trimethyltin) oxide, bis (tributyltin) oxide, bis (trioctyltin) oxide, bis (triisooctyltin) oxide, bis (tricyclohexyltin) oxide, bis (triphenyltin) oxide, and bis (triallyltin oxide).

SULFIDES

Methyltin sulfide, butyltin sulfide, octyltin sulfide, cyclohexyltin sulfide, phenyltin sulfide, allyltin sulfide, dimethyltin sulfide, dibutyltin sulfide, dioctyltin sulfide, diisooctyltin sulfide, dicyclohexyltin sulfide, diphenyltin sulfide, diallyltin sulfide, trimethyltin sulfide, tributyltin sulfide, trioctyltin sulfide, triiosoctyltin sulfide, tricyclohexyltin sulfide, triphenyltin sulfide and triallyltin sulfide.

ESTERS OF STANNOIC ACIDS

Methyl methylstannoate, butyl methylstannoate, octyl methylstannoate, lauryl methylstannoate, octadecyl methylstannoate, cyclohexyl methylstannoate, allyl methylstannoate, phenyl methylstannoaate, methyl butylstannoate, butyl butylstannoate, octyl butylstannoate, lauryl butylstannoate, octadecyl butylstannoate, cyclohexyl butylsannoate, phenyl methylstannoate, methyl butylstannoate, octylstannoate, butyl octylstannoate, octyl octylstannoate, lauryl octylstannoate, octadecyl octylstannoate, cyclohexyl octylstannoate, allyl octylstannoate, phenyl octylstannoate, methyl phenylstannoate, butyl phenylstannoate, octyl phenylstannoate, lauryl phenylstannoate, octadecyl phenylstannoate, cyclohexyl phenylstannoate, allyl phenylstannoate, phenyl phenylstannoate, methyl cyclohexylstannoate, butyl cyclohexylstannoate, octyl cyclohexylstannoate, lauryl cyclohexylstannoate, octadecyl cyclohexylstannoate, cyclohexyl cyclohexylstannoate, allyl cyclohexylstannoate and phenyl cyclohexylstannoate.

ESTERS OF THIOSTANNOIC ACIDS

Methyl methylthiostannoate, butyl methylthiostannoate, octyl methylthiostannoate, lauryl methylthiostannoate, octadecyl methylthiostannoate, cyclohexyl methylthiostannoate, allyl methylthiostannoate, phenyl methylthiostannoate, methyl butylthiostannoate, butyl butylthiostannoate, octyl butylthiostannoate, lauryl butylthiosannoate, octadecyl butylthiostannoate, cyclohexyl butylthiostannoate, allyl butylthiostannoate, phenyl butylthiostannoate, methyl octylthiostannoate, butyl octylthiostannoate, octyl octylthiostannoate, lauryl octylthiostannoate, octadecyl octyl thiostannoate, cyclohexyl octylthiostannoate, allyl octylthiostannoate, phenyl octylthiostannoate, methyl phenylthiostannoate, butyl phenylthiostannoate, octyl phenylthiostannoate, lauryl phenylthiostannoate, octadecyl phenylthiostannoate, cyclohexyl phenylthiostannoate, allyl phenylthiostannoate, phenyl phenylthiostannoate, methyl cyclohexylthiostannoate, butyl cyclohexylthiostannoate, octyl cyclohexylthiostannoate, lauryl cyclohexylthiostannoate, octadecyl cyclohexylthiostannoate, cyclohexyl cyclohexylthiostannoate, allyl cyclohexylthiostannoate, and phenyl cyclohexylthiostannoate.

MONOORGANOTIN TRIS ALCOHOLATES

Methyltin tris (methylate) butyltin tris (methylate), octyltin tris (methylate), phenyltin tris (methylate), cyclohexylin tris (methylate), allyltin tris (methylate), methyltin tris (propylate), butyltin tris (propylate), octyltin tris (propylate), phenyltin tris (propylate), cyclohexyltin tris (propylate), allyltin tris (propylate), methyltin tris (octylate), butyltin tris (octylate), octyltin tris (octylate), phenyltin tris (octylate), cyclohexyltin tris (octylate), allyltin tris (octylate), methyltin tris (laurylate), butyltin tris (laurylate), octyltin tris (laurylate), phenyltin tris (laurylate), cyclohexyltin tris (laurylate), allyltin tris (laurylate), methyltin tris (octadecylate), butyltin tris (octadecylate), octyltin tris (octadecylate), phenyltin tris (octadecylate), cyclohexyltin tris (octadecylate), allyltin tris (octadecylate), methyltin tris (phenylate), butyltin tris (phenylate), octyltin tris (phenylate), phenyltin tris (phenylate), cyclohexyltin tris (phenylate), allyltin tris (phenylate), methyltin tris (cyclohexylate), butyltin tris (cyclohexylate), octyltin tris (cyclohexylate), phenyltin tris (cyclohexylate), cyclohexyltin tris (cyclohexylate), allyltin tris (cyclohexylate), methyltin tris (allylate), butyltin tris (allylate), octyltin tris (allylate), phenyltin tris (allylate), cyclohexyltin tris (allylate) and allyltin tris (allylate).

DIORGANOTIN BIS ALCOHOLATES

Dimethyltin bis (methylate), dibutyltin bis (methylate), dioctyltin bis (methylate), diphenyltin bis (methylate), dicyclohexyltin bis (methylate), diallyltin bis (methylate), dimethyltin bis (propylate), dibutyltin bis (propylate), dioctyltin bis (propylate), diphenyltin bis (propylate), dicyclohexyltin bis (propylate), diallyltin bis (propylate), dimethyltin bis (octylate), dibutyltin bis (octylate), dioctyltin bis (octylate), diphenyltin bis (octylate), dicyclohexyltin bis (octylate), diallyltin bis (octylate), dimethyltin bis (laurylate), dibutyltin bis (laurylate), dioctyltin bis (laurylate), diphenyltin bis (laurylate), dicyclohexyltin bis (laurylate), diallyltin bis (laurylate), dimethyltin bis (octadecylate), dibutyltin bis (octadecylate), dioctyltin bis (octadecylate), diphenyltin bis (octadecylate), dicyclohexyltin bis (octadecylate), diallyltin bis (octadecylate), dimethyltin bis (phenylate), dibutyltin bis (phenylate), dioctyltin bis (phenylate), diphenyltin bis (phenylate), dicyclohexyltin bis (phenylate), diallyltin bis (phenylate), dimethyltin bis (cyclohexylate), dibutyltin bis (cyclohexylate), dioctyltin bis (cyclohexylate), diphenyltin bis (cyclohexylate), dicyclohexyltin bis (cyclohexylate), diallyltin bis (cyclohexylate), dimethyltin bis (allylate), dibutyltin bis (allylate), dioctyltin bis (allylate), diphenyltin bis (allylate), dicyclohexyltin bis (allylate) and diallyltin bis (allylate).

TRIORGANOTIN ALCOHOLATES

Trimethyltin methylate, tributyltin methylate, trioctyltin methylate, triphenyltin methylate, tricyclohexyltin methylate, triallyltin methylate, trimethyltin propylate, tributyltin propylate, trioctyltin propylate, triphenylin propylate, tricyclohexyltin propylate, triallyltin propylate, trimethyltin octylate, trimethyltin octylate, trioctyltin octylate, triphenyltin octylate, tricyclohexyltin octylate, triallyltin octylate, trimethyltin laurylate, tributyltin laurylate, trioctyltin laurylate, triphenyltin laurylate, tricyclohexyltin laurylate, triallyltin laurylate, trimethyltin octadecylate, tributyltin octadecylate, trioctyltin octadecylate, triphenyltin octadecylate, tricyclohexyltin octadecylate, triallyltin octadecylate, trimethyltin phenylate, tributyltin phenylate, trioctyltin phenylate, triphenyltin phenylate, tricyclohexyltin phenylate, triallyltin phenylate, trimethyltin cyclohexylate, tributyltin cyclohexylate, trioctyltin cyclohexylate, triphenyltin cyclohexylate, tricyclohexyltin cyclohexylate, triallyltin cyclohexylate, trimethyltin allylate, tributyltin allylate, trioctyltin allylate, triphenyltin allylate, tricyclohexyltin allylate, and triallyltin allylate.

MONOORGANOTIN CARBOXYLATES

Methyltin tris (acetate), butyltin tris (acetate), octyltin tris (acetate), cyclohexyltin tris (acetate), phenyltin tris (acetate), allyltin tris (acetate), methyltin tris (propionate), butyltin tris (propionate), octyltin tris (propionate), phenyltin tris (propionate), allyltin tris (propionate), methyltin tris (butyrate), butyltin tris (butyrate), octyltin tris (butyrate), phenyltin tris (butyrate), allyltin tris (butyrate), methyltin tris (valerate), butyltin tris (valerate), octyltin tris (valerate), phenyltin tris (valerate), allyltin tris (valerate), methyltin tris (decanoate), butyltin tris (decanoate), octyltin tris (decanoate), phenyltin tris (decanoate), allyltin tris (decanoate), methyltin tris (laurate), butyltin tris (laurate), octyltin tris (laurate), phenyltin tris (laurate), allyltin tris (laurate), methyltin tris (octadecanoate), butyltin tris (octadecanoate), octyltin tris (octadecanoate), phenyltin tris (octadecanoate), allyltin tris (octadecanoate), methyltin tris (propenoate), butyltin tris (propenoate), octyltin tris (propenoate), phenyltin tris (propenoate), allyltin tris (propenoate), methyltin tris (benzoate), butyltin tris (benzoate), octyltin tris (benzoate), phenyltin tris (benzoate), allyltin tris (benzoate), methyltin tris (monooctyloxalate), butyltin tris (monooctyloxalate), octyltin tris (monooctyl oxalate), phenyltin tris (monooctyl oxalate), allyltin tris (monooctyloxalate).

Methyltin tris (monobutyl malonate), butyltin tris (monobutyl malonate), octyltin tris (monobutyl malonate), phenyltin tris (monobutyl malonate), methyltin tris (monomethyl succinate), butyltin tris (monomethyl succinate), octyltin tris (monomethyl succinate), allyltin tris (monomethyl succinate), methyltin tris (monobutyl maleate), butyltin tris (monobutyl maleate), octyltin tris (monobutyl maleate), phenyltin tris (monobutyl maleate), allyltin tris (monobutyl maleate), methyltin tris (monoethyl fumarate), butyltin tris (monoethyl fumarate), octyltin tris (monoethyl fumarate) phenyltin tris (monoethyl fumarate), allyltin tris (monoethyl fumarate), methyltin tris (monobutyl glutarate), butyltin tris (monobutyl glutarate), octyltin tris (monobutyl glutarate), phenyltin tris (monobutyl glutarate), allyltin tris (monobutyl glutarate), methyltin tris (monopropyl adipate), butyltin tris (monopropyl adipate), octyltin tris (monopropyl adipate), phenyltin tris (monopropyl adipate), allyltin tris (monopropyl adipate), methyltin tris (monoisooctyl succinate), butyltin tris (monoisooctyl succinate), octyltin tris (monoisooctyl succinate), phenyltin tris (monoisooctyl succinate), allyltin tris (monoisooctyl succinate), methyltin tris (monomethyl sebacate), butyltin tris (monomethylsebacate), octyltin tris (monomethyl sebacate), phenyltin tris (monomethyl sebacate), allyltin tris (monomethyl sebacate), methyltin tris (monophenyl succinate), butyltin tris (monophenyl succinate), octyl tin tris (monophenyl succinate), phenyltin tris (monophenyl succinate), allyltin tris (monophenyl succinate), methyltin tris (monobenzyl malonate), butyltin tris (monobenzyl malonate), octyltin tris (monobenzyl malonate), phenyltin tris (monobenzyl malonate), allyltin tris (monobenzyl malonate), methyltin tris (monocyclohexyl adipate), butyltin tris (monocyclohexyl adipate), octyltin tris (monocyclohexyl adipate), phenyltin tris (monocyclohexyl adipate), allyltin tris (monocyclohexyl adipate), methyltin tris (monooctadecyl azelate), butyltin tris (monooctadecyl azelate), octyltin tris (monooctadecyl azelate), phenyltin tris (monooctadecyl azelate), allyltin tris (monooctadecyl azelate), methyltin tris (monoallyl succinate), butyltin tris (monoallyl succinate), octyltin tris (monoallyl succinate), phenyltin tris (monoallyl succinate), allyltin tris (monoallyl succinate), methyltin tris (monooleyl glutarate), butyltin tris (monooleyl glutarate), octyltin tris (monooleyl glutarate), phenyltin tris (monooleyl glutarate), and allyltin tris (monooleyl glutarate).

DIORGANOTIN CARBOXYLATES

Dimethyltin bis (acetate), dibutyltin bis (acetate), dioctyltin bis (acetate), diphenyltin bis (acetate), diallyltin bis (acetate), dimethyltin tris (propionate), dibutyltin bis (propionate), dioctyltin bis (propionate), diphenyltin bis (propionate), diallyltin bis (propionate), dimethyltin bis (butyrate), dibutyltin bis (butyrate), dioctyltin bis (butyrate), diphenyltin bis (butyrate), diallyltin bis (butyrate), dimethyltin bis (valerate), dibutyltin bis (valerate), dioctyltin bis (valerate), diphenyltin bis (valerate), diallyltin bis (valerate), dimethyltin bis (decanoate), dibutyltin bis (decanoate) dioctyltin bis (decanoate), diphenyltin bis (decanoate), diallyltin bis (decanoate), dimethyltin bis (laurate), dibutyltin bis (laurate), dioctyltin bis (laurate), diphenyltin bis (laurate), diallyltin bis (laurate), dimethyltin bis (octadecanoate), dibutyltin bis (octadecanoate), dioctyltin bis (octadecanoate), diphenyltin bis (octadecanoate), diallyltin bis (octadecanoate), dimethyltin bis (propenoate), dibutyltin bis (propenoate), dioctyltin bis (propenoate), diphenyltin bis (propenoate), diallyltin bis (propenoate), dimethyltin bis (benzoate), dibutyltin bis (benzoate), dioctyltin bis (benzoate), diphenyltin bis (benzoate), dimethyltin bis (monoctyl oxalate) dibutyltin bis (monooctyl oxalate), dioctyltin bis (monooctyl oxalate) diphenyltin bis (monooctyloxalate), diallyltin bis (monooctyl oxalate), dimethyltin bis (monobutyl malonate), dibutyltin bis (monobutyl malonate), dioctyltin bis (monobutyl malonate), dioctyl tin bis (monobutyl malonate), dioctyltin bis (monobutyl malonate), dioctyl tin bis (monobutyl malonate), diphenyltin bis (monobutyl malonate), diallyltin bis (monobutyl malonate), dimethyltin bis (monomethyl succinate), dibutyltin bis (monomethyl succinate), dioctyl tin bis (monoethyl succinate), diphenyltin bis (monomethyl succinate), diallyltin bis (monomethyl succinate), dimethyltin bis (monobutyl maleate), dibutyltin bis (monobutyl maleate), dioctyltin bis (monobutyl maleate), diphenyltin bis (monobutyl maleate), diallyltin bis (monobutyl maleate), dimethyl bis (monoethyl fumarate), dibutyltin bis (monoethyl fumarate), dioctyltin bis (monoethyl fumarate), diphenyltin bis (monoethyl fumarate), diallyltin bis (monoethyl fumarate), dimethyltin bis (monobutyl glutarate), dibutyltin bis (monobutyl glutarate), dioctyltin bis (monobutyl glutarate), diphenyltin bis (monobutyl glutarate), diallyltin bis (monobutyl glutarate), dimethyltin bis (monopropyl adipate), dibutyltin bis (monopropyl adipate), dioctyltin bis (monopropyl adipate), diphenyltin bis (monopropyl adipate), diallyltin bis (monopropyl adipate), dimethyltin bis (monoisooctyl succinate), dibutyltin bis (monoisooctyl succinate), dioctyltin bis (monoisooctyl succinate), diphenyltin bis (monoisooctyl succinate), diallyltin bis (monoisooctyl succinate), dimethyltin bis (monomethyl sebacate), dibutyltin bis (monomethyl sebacate), dioctyltin bis (monomethyl sebacate), diphenyltin bis (monomethyl sebacate), diallyltin bis (monomethyl sebacate), dimethyltin bis (monophenyl succinate), dibutyltin bis (monophenyl succinate), dioctyltin bis (monophenyl succinate), diphenyltin bis (monophenyl succinate), diallyltin bis (monophenyl succinate), dimethyltin bis (monobenzyl malonate), dibutyltin bis (monobenzyl malonate), dioctyltin bis (monobenzyl malonate), diphenyltin bis (monobenzyl malonate), diallyltin bis (monobenzyl malonate), dimethyltin bis (monocyclohexyl adipate), dibutyltin bis (monocyclohexyl adipate), dioctyltin bis (monocyclohexyl adipate), diphenyltin bis (monocyclohexyl adipate), diallyltin bis (monocyclohexyl adipate), dimethyltin bis (monooctadecyl azelate), dibutyltin bis (monooctadecyl azelate), dioctyltin bis (monooctadecyl azelate), diphenyltin bis (monooctadecyl azelate), diallyltin bis (monooctadecyl azelate), dimethyltin bis (monoallyl succinate), dibutyltin bis (monoallyl succinate), dioctyltin bis (monoallyl succinate), diphenyltin bis (monoallyl succinate), diallyltin bis (monoallyl succinate), dimethyltin bis (monooleyl glutarate), dibutyltin bis (monooleyl glutarate), dioctyltin bis (monooleyl glutarate), diphenyltin bis (monooleyl glutarate), diallyltin bis (monooleyl glutarate), dimethyltin oxalate, dibutyltin oxalate, dioctyltin oxalate, diphenyltin oxalate, diallyltin oxalate, dimethyltin malonate, dibutyltin malonate, dioctyltin malonate, diphenyltin malonate, diallyltin malonate, dimethyltin succinate, dibutyltin succinate, dioctyltin succinate, diphenyltin succinate, diallyltin succinate, dimethyltin maleate, dibutyltin maleate, dioctyltin maleate, diphenyltin maleate, diallyltin maleate, dimethyltin fumarate, dibutyltin fumarate, dioctyltin fumarate, diphenyltin fumarate, diallyltin fumarate, dimethyltin glutarate, dibutyltin glutarate, dioctyltin glutarate, diphenyltin glutarate, diallyltin glutarate, dimethyltin adipate, dibutyltin adipate, dioctyltin adipate, diphenyltin adipate, diallyltin adipate, dimethyltin sebacate, dibutyltin sebacate, dibutyltin sebacate, dioctyltin sebacate, diphenyltin sebacate, diallyltin sebacate, dimethyltin azelate, dibutyltin azelate, dioctyltin azelate, diphenyltin azelate, diallyltin azelate.

TRIOGANOTIN CARBOXYLATES

Trimethyltin acetate, tributyltin acetate, trioctyltin acetate, triphenyltin acetate, triallyltin acetate, trimethyltin propionate, tributyltin propionate, trioctyltin propionate, triphenyltin propionate, triallyltin propionate, trimethyltin butyrate, tributyltin butyrate, trioctyltin butyrate, triphenyltin butyrate, triallyltin buyrate, trimethyltin valerate, tributyltin valerate, trioctyltin valerate, triphenyltin valerate, triallyltin valerate, trimethyltin deconate, tributyltin decanoate, trioctyltin decanoate, triallyltin decanoate, trimethyltin laurate, tributyltin laurate, trioctyltin laurate, triphenyltin laurate, triallyltin laurate, trimethyltin octadecanoate, tributyltin octadecanoate, trioctyltin octadeconate, triphenyltin octadecanoate, triallyltin octadecanonate, trimethyltin propenoate, tributyltin propenoate, trioctyltin propenoate, triphenyltin propenoate, triallyltin propenoate, trimethyltin benzoate, tributyltin benzoate, trioctyltin benzoate, triphenyltin benzoate, triallyltin benzoate, trimethyltin (monooctyl oxalate), tributyltin (monooctyl oxalate), trioctyltin (monooctyl oxalate), triphenyltin (monooctyl oxalate), triallyltin (monooctyl oxalate), trimethyltin monobutyl malonate, tributyltin (monobutyl malonate), trioctyltin (monobutyl malonate), triphenyltin (monobutyl malonate), triallyltin (monobutyl malonate), trimethyltin (monomethyl succinate), tributyltin (monomethyl succinate), trioctyltin (monomethyl succinate), triphenyltin (monomethyl succinate), triallyltin (monomethyl succinate), trimethyltin (monobutyl maleate), tributyltin (monobutyl maleate), trioctyltin (monobutyl maleate), triphenyltin (monobutyl maleate), triallyltin (monobutyl maleate), trimethyltin (monoethyl fumarate), tributyltin (monoethyl fumarate), trioctyltin (monoethyl fumarate), triphenyltin (monoethyl fumarate), triallyltin (monoethyl fumarate), trimethyltin (monobutyl glutarate), tributyltin (monobutyl glutarate), trioctyltin (monobutyl glutarate), triphenyltin (monobutyl glutarate), triallyltin (monobutyl glutarate), trimethyltin (monopropyl adipate), tributyltin (monopropyl adipate), trioctyltin (monopropyl adipate), triphenyltin (monopropyl adipate), triallyltin (monopropyl adipate), trimethyltin (monoisooctyl succinate), tributyltin (monoisooctyl succinate), trioctyltin (monoisooctyl succinate), triphenyltin (monoisooctyl succinate), triallyltin (monoisooctyl succinate), trimethyltin (monomethyl sebacate), tributyltin (monomethyl sebacate), trioctyltin (monomethyl sebacate), triphenyltin (monomethyl sebacate), triallyltin (monomethyl sebacate), trimethyltin (monophenyl succinate), tributyltin (monophenyl succinate), trioctyltin (monophenyl succinate), triphenyltin (monophenyl succinate), triallyltin (monophenyl succinate), trimethyltin (monobenzyl malonate), tributyltin (monobenzyl malonate), trioctyltin (monobenzyl malonate), triphenyltin (monobenzyl malonate), triallyltin (monobenzyl malonate), trimethyltin (monocyclohexyl adipate), tributyltin (monocyclohexyl adipate), trioctyltin (monocyclohexyl adipate), triphenyltin (monocyclohexyl adipate), triallyltin (monocyclohexyl adipate), trimethyltin (monooctadecyl azelate), tributyltin (monooctadecyl azelate), trioctyltin (monooctadecyl azelate), triphenyltin (monooctadecyl azelate), triallyltin (monooctadecyl azelate), trimethyltin (monoallyl succinate), tributyltin (monoallyl succinate), trioctyltin (monoallyl succinate), triphenyltin (monoallyl succinate), triallyltin (monoallyl succinate), trimethyltin (monooleyl glutarate), tributyltin (monooleyl glutarate), trioctyltin (monooleyl glutarate), triphenyltin (monooleyl glutarate), triallyltin (monooleyl glutarate), bis (trimethyltin)oxalate, bis (tributyltin) oxalate, bis (trioctyltin) oxalate, bis (triphenyltin) oxalate, bis (triallyltin) oxalate, bis (trimethyltin) malonate, bis (tributyltin) malonate, bis (trioctyltin) malonate, bis (triphenyltin) malonate, bis (triallyltin) malonate, bis (trimethyltin) succinate, bis (tributyltin) succinate, bis (trioctyltin) succinate, bis (triphenyltin) succinate, bis (triallyltin) succinate, bis (trimethyltin) maleate, bis (tributyltin) maleate, bis (trioctyltin) maleate, bis (triphenyltin) maleate, bis (triallyltin) maleate, bis (trimethyltin) fumarate, bis (tributyltin) fumarate, bis (trioctyltin) fumarate, bis (triphenyltin) fumarate, bis (triallyltin) fumarate, bis (trimethyltin) glutarate, bis (tributyltin) glutarate, bis (trioctyltin) glutarate, bis (triphenyltin) glutarate, bis (triallyltin) glutarate, bis (trimethyltin) adipate, bis (tributyltin) adipate, bis (trioctyltin) adipate, bis (triphenyltin) adipate, bis (triallyltin) adipate, bis (trimethyltin) sebacate, bis (tributyltin) sebacate, bis (trioctyltin) sebacate, bis (triphenyltin) sebacate, bis (triallyltin) sebacate, bis (trimethyltin) azelate, bis (tributyltin) azelate, bis (trioctyltin) azelate, bis (triphenyltin) azelate, and bis (triallyltin) azelate.

ORGANOTIN MERCAPTOCARBOXYLATES

Methyltin tris (isooctylmercaptoacetate), propyltin tris (isooctylmercaptoacetate), butyltin tris (isooctylmercaptoacetate), octyltin tris (isooctylmercaptoacetate), isooctyltin tris (isooctylmercaptoacetate), dodecyltin tris (isooctylmercaptoacetate), phenyltin tris (isooctylmercaptoacetate), benzyltin tris (isooctylmercaptoacetate), p-methylphenyltin tris (isooctylmercaptoacetate), cyclohexyltin tris (isooctylmercaptoacetate), allyltin tris (isooctylmercaptoacetate), methyltin tris (methylmercaptoacetate), propyltin tris (methylmercaptoacetate), butyltin tris (methylmercaptoacetate) octyltin tris (methylmercaptoacetate), isooctyltin tris (methylmercaptoacetate), dodecyltin tris (methylmercaptoacetate), phenyltin tris (methylmercaptoacetate), benzyltin tris (methylmercaptoacetate), p-methylphenyltin tris (methylmercaptoacetate), cyclohexyltin tris (methylmercaptoacetate), allyltin tris (methylmercaptoacetate), methyltin tris (butylmercaptoacetate), propyltin tris (butylmercaptoacetate, octyltin tris (butylmercaptoacetate), isooctyltin tris (butylmercaptoacetate), dodecyltin tris (butylmercaptoacetate), phenyltin tris (butylmercaptoacetate), benzyltin tris (butylmercaptoacetate), p-methylphenyltin tris (butylmercaptoacetate), cyclohexyltin tris (butylmercaptoacetate), allyltin tris (butylmercaptoacetate), methyltin tris (octadecylmercaptoacetate), propyltin tris (octadecylmercaptoacetate), butyltin tris (octadecylmercaptoacetate), octyltin tris (octadecylmercaptoacetate), isooctyltin tris (octadecylmercaptoacetate), dodecyltin tris (octadecylmercaptoacetate), phenyltin tris (octadecylmercaptoacetate), benzyltin tris (octadecylmercaptoacetate, p-methylphenyltin tris (octadecylmercaptoacetate), cyclohexyltin tris (octadecylmercaptoacetate), allyltin tris (octadecylmercaptoacetate), methyltin tris (cyclohexylmercaptoacetate), propyltin tris (cyclohexylmercaptoacetate), butyltin tris (cyclohexylmercaptoaceacetate), octyltin tris (cyclohexylmercaptoacetate, isooctyltin tris (cyclohexylmercaptoacetate), dodecyltin tris (cyclohexylmercaptoacetate), phenyltin tris (cyclohexylmercaptoacetate), benzyltin tris (cyclohexylmercaptoacetate), p-methylphenyltin tris (cyclohexylmercaptoacetate), cyclohexyltin tris (cyclohexylmercaptoacetate), allyltin tris (cyclohexylmercaptoacetate), methyltin tris (benzylmercaptoacetate), propyltin tris (benzylmercaptoacetate), butyltin tris (benzylmercaptoacetate), octyltin tris (benzylmercaptoacetate), isooctyltin tris (benzylmercaptoacetate), dodecyltin tris (benzylmercaptoacetate), phenyltin tris (benzylmercapoacetate), benzyltin tris (benzylmercaptoacetate), p-methylphenyltin tris (benzylmercaptoacetate) cyclohexyltin tris (benzylmercaptoacetate), allyltin tris (benzylmercaptoacetate), methyltin tris (isooctyl-β-mercaptopropionate), propyltin tris (isooctyl-β-mercaptopropionate), butyltin tris (isooctyl-β-mercaptopropionate), octyltin tris (isooctyl-β-mercaptopropionate), isooctyltin tris (isooctyl-β-mercaptopropionate), dodecyltin tris (isooctyl-β-mercaptopropionate), phenyltin tris (isooctyl-β-mercaptopropionate), benzyltin tris (isooctyl-β-mercaptopropionate), p-methylphenyltin tris (isooctyl-β-mercaptopropionate), cyclohexyltin tris (isooctyl-β-mercaptopropionate), allyltin tris (isooctyl-β-mercaptopropionate), methyltin tris (methyl-β-mercaptopropionate), propyltin tris (methyl-β-mercaptopropionate), butyltin tris (methyl-β-mercaptopropionate), octyltin tris (methyl-β-mercaptopropionate), isooctyltin tris (methyl-β-mercaptopropionate), dodecyltin tris (methyl-β-mercaptopropionate), phenyltin tris (methyl-β-mercaptopropionate), benzyltin tris (methyl-β-mercaptopropionate), p-methylphenyltin tris (methyl-β-mercaptopropionate), cyclohexyltin tris (methyl-β-mercaptopropionate), allyltin tris (methyl-β-mercaptopropionate), methyltin tris (butyl-β-mercaptopropionate), propyltin tris (butyl-β-mercaptopropionate), octyltin tris (butyl-β-mercaptopropionate), isooctyltin tris (butyl-β-mercaptopropionate), dodecyltin tris (butyl - β - mercaptopropionate), phenyltin tris (butyl-β-mercaptopropionate), benzyltin tris (butyl-β-mercaptopropionate) p-methylphenyltin tris (butyl - β - mercaptopropionate), cyclohexyltin tris (butyl-β-mercaptopropionate), allyltin tris (butyl-β-mercaptopropionate), methyltin tris (octadecyl-β-mercaptopropionate), propyltin tris (octadecyl-β-mercaptopropionate), butyltin tris (octadecyl-β-mercaptopropionate), octyltin tris (octadecyl-β-mercaptopropionate), isooctyltin tris (octadecyl-β-mercaptopropionate), dodecyltin tris (octadecyl-β-mercaptopropionate), phenyltin tris (octadecyl-β-mercaptopropionate), benzyltin tris (octadecyl - β - mercaptopropionate), p-methylphenyltin tris (octadecyl-β-mercaptopropionate), cyclohexyltin tris (octadecyl-β-mercaptopropionate), allyltin tris (octadecyl-β-mercaptopropionate), methyltin tris (cyclohexyl-β-mercaptopropionate), propyltin tris (cyclohexyl-β-mercaptopropionate), butyltin tris (cyclohexyl-β-mercaptopropionate), octyltin tris (cyclohexyl-β-mercaptopropionate), dodecyltin tris (cyclohexylmercaptopropionate), phenyltin tris (cyclohexyl-β-mercaptopropionate), benzyltin tris (cyclohexylβ-mercaptopropionate), p-methylphenyltin tris (cyclohexyl-β-mercaptopropionate), benzyltin tris (cyclohexyl-β-mercaptopropio-β - mercaptobutyrate), dodecyltin this (benzyl - β - mermethyltin tris (benzyl-β-mercaptopropionate), propyltin tris (benzyl-β-mercaptopropionate), butyltin tris (benzyl-β-mercaptopropionate), octyltin tris (benzyl-β-mercaptopropionate), isooctyltin tris (benzyl - β - mercaptopropionate), dodecyltin tris (benzyl-β-mercaptopropionate), phenyltin tris (benzyl-β-mercaptopropionate), benzyltin tris (benzyl-β-mercaptopropionate), p-methylphenyltin tris (benzyl-β-mercaptopropionate), cyclohexyltin tris (benzyl-β-mercaptopropionate), allyltin trin (benzyl-β-mercaptopropionate), methyltin tris (benzyl-β-mercaptobutyrate), propyltin tris (benzyl-β-mercaptobutyrate), butyltin tris (benzyl-β-mercaptobutyrate), octyltin tris (benzyl-β-mercaptobutyrate), isooctyltin tris (benzyl-β-(mercaptobutyrate), dodecyltin tris (benzyl-β-mercaptobutyrate), phenyltin tris (benzyl-β-mercaptobutyrate), benzyltin tris (benzyl-β-mercaptobutyrate), p-methylphenyltin tris (benzyl-β-mercaptobutyrate), cyclohexyltin tris (benzyl-β-mercaptobutyrate), allyltin tris (benzyl-β-mercaptobutyrate), methyltin tris [cyclohexylidene-1,1-bis (mercaptopropionate) mono methyl ester], propyltin tris [cyclohexylidene-1,1-bis (mercaptopropionate) mono methyl ester], butyltin tris [cyclohexylidene-1,1-bis (mercaptopropionate) mono methyl ester], octyltin tris [cyclohexylidene - 1,1 - bis (mercaptopropionate) mono methyl ester], isooctyltin tris [cyclohexylidene-1,1-bis (mercaptopropionate) monomethyl ester], dodecyltin tris [cyclohexylidene-1,1-bis (mercaptopropionate) mono methyl ester], phenyltin tris [cyclohexylidene-1,1-bis (mercaptopropionate) monomethyl ester], benzyltin tris [cyclohexylidene - 1,1 - bis (mercaptopropionate) monomethyl ester], p-methylphenyltin tris [cyclohexylidene-1,1-bis (mercaptopropionate) monomethyl ester], cyclohexyltin tris [cyclohexylidene-1,1-bis (mercaptopropionate) monomethyl ester], allyltin tris [cyclohexylidene-1,1-bis (mercaptopropionate) monomethyl ester and the corresponding monopropyl, butyl, octyl, isooctyl, decyl, dodecyl, octadecyl, phenyl, benzyl, p-methyl phenyl, cyclohexyl and alkyl esters of the mercaptopionic acid containing compounds as well as the corresponding mercapto acetic acid and mercaptobutyric acid containing series. Dimethyltin bis-, dipropyltin bis-, dibutyltin bis-, dioctyltin bis-, diisooctyltin bis-, didodecyltin bis-, diphenyltin bis-, dibenzyltin bis-, di-p-methylphenyltin bis-, dicyclohexyltin bis-, and diallyltin bis (isooctyl mercaptoacetate) and each of the corresponding methyl-, butyl-, octadecyl-, cyclohexyl-, and benzyl-mercaptoacetates, β-mercaptopropionates, β-mercaptobutyrates and cyclohexylidene-1,1-bis (β-mercaptopropionates); dimethyltin-, dipropyltin-, dibutyltin-, dioctyltin-, diisooctyltin-, didodecyltin-, diphenyltin-, dibenzyltin-, di-p-methylphenyltin, dicyclohexyl and diallyltin mercaptoacetates and each of the corresponding β-mercaptopropionates, β-mercaptobutyrates and cyclohexylidene-1,1-bis (β-mercaptopropionates); trimethyltin-, tripropyltin, tributyltin, trioctyltin-, triisooctyltin-, tridodecyltin-, triphenyltin, tribenzyltin-, tri (p-butylphenyl) tin-, tricyclohexyltin- and triallyltin-isooctyl-mercaptoacetate and each of the corresponding methyl-, butyl, octadecyl-, cyclohexyl- and benzyl-mercaptoacetates, β-mercaptopropionates, β-mercaptobutyrates, and cyclohexylidene-1,1-bis (β-mercaptopropionates); bis (trimethyltin)-, bis (tripropyltin)-, bis (tributyltin)-, bis trioctyltin-, bis (triisooctyltin)-, bis (tridodecyltin)-, bis (triphenyltin)-, bis (tribenzyltin)-, bis [tri(p-butylphenyl)tin] bis (tricyclohexyltin)- and bis (triallyltin) mercaptoacetates and each of the corresponding β-mercaptopropionates, β-mercaptobutyrates and cyclohexylidene-1,1-bis (β-mercaptopropionates). Also, the mercaptoacid esters taught by Hechenbleikner et al. in U.S. Pat. Nos. 3,078,270 and 3,196,129 are suitable.

ORGANOTIN MERCAPTIDES

Methyltin tris (octyl mercaptide), propyltin tris (octyl mercaptide), butyltin tris (octyl mercaptide), isobutyl tin tris (octyl mercaptide), octyltin tris (octyl mercaptide), isooctyltin tris (octyl mercaptide), dodecyltin tris (octyl mercaptide), phenyltin tris (octyl mercaptide), benzyltin tris (octyl-mercaptide), cyclohexyltin tris (octyl marcaptide), p-methylphenyltin tris (octyl mercaptide), allyltin tris (octyl mercaptide), methyltin tris (lauryl mercaptide), propyltin tris (laurylmercaptide), butyltin tris (dodecyl mercaptide) isobutyltin tris (dodecyl mercaptide), octyltin tris (benzyl mercaptide), isooctyltin tris (benzyl mercaptide), dodecyltin tris (p-methylphenyl mercaptide), phenyltin tris (p-methylphenyl mercaptide), phenyltin tris (cyclohexyl mercaptide), benzyltin tris (cyclohexyl mercaptide), cyclohexyltin (cyclohexyl mercaptide), p-methylphenyltin tris (cyclohexyl mercaptide), allyltin tris (cyclohexyl mercaptide), dimethyltin bis-, dipropyl bis-, dibutyltin bis-, diisobutyltin bis-, dioctyltin bis-, dioctyltin bis-, diisooctyltin bis-, didodecyltin bis-, dipenyltin bis-, dibenzyltin bis-, dicyclohexyltin bis-, di-p-methylphenyltin bis- and diallyltin bis- octyl mercaptides and each of the corresponding decyl, dodecyl, octadecyl, benzyl, p-butyl phenyl and cyclohexyl mercaptides; trimethyltin-, triethyltin-, tripropyltin-, tributyltin, triisobutyltin-, trioctyltin-, triisooctyltin-, tridodecyltin-, triphenyltin-, tribenzyltin-, tricyclohexyltin-, tri-p-methylphenyltin- and triallyltin octyl mercaptides and each of the corresponding decyl, dodecyl, benzyl, p-butylphenyl and cyclohexyl mercaptides.

THIOCARBOXYLATES

Dilauryl-thiodipropionate, distearyl 3,3'-thiodipropionate, dioctyl-3,3'-thiodipropionate, dibenzyl - 3,3' - thiodipropionate, lauryl myristyl-3,3'-thiodipropionate, diphenyl-3,3'-thiodipropionate, di-p-methoxyphenyl-3,3'-thiodipropionate, didecyl-3,3'-thiodipropionate, dibenzyl-3,3'-thiodipropionate, diethyl-3,3'-thiodipropionate, diisooctyl dithiodipropionate, distearyl dithiodiacetate, lauryl ester of 3-methyl mercaptopropionic acid, lauryl ester of 3-butylmercaptopropionic acid, lauryl ester of 3-butyl-mercaptopropionic acid, lauryl ester of 3-lauryl mercaptopropionic acid, phenyl ester of 3-octyl mercaptopropionic acid, phenyl ester of 3-octyl mercaptopropionic acid, lauryl ester of 3-phenyl mercaptopropionic acid, lauryl ester of 3-benzyl mercaptopropionic acid, lauryl ester of 3-p-methoxy phenyl mercaptopropionic acid, lauryl ester of 3-cyclohexyl mercaptopropionic acid, lauryl ester of 3-hydroxymethyl mercaptopropionic acid, myristyl ester of 3-hydroxyethyl mercaptopropionic acid, octyl ester of 3-methoxymethyl mercaptopropionic acid, dilauryl ester of 3-carboxylmethyl mercaptopropionic acid, dilauryl ester of 3-carboxylpropyl mercaptopropionic acid, dilauryl 4,7-dithiasebacate, dimyristyl - 4,11 - dithiatetradecandioate, lauryl-3-benzothiazyl mercaptopropionate, decylthiodilauryl maleate, phenylthiodioctyl maleate, cetyl (1,2-dicarboethoxyethylthio) propionate and benzylthiodimyristyl maleate.

THIOANHYDRIDES

Octanoic thioanhydride, decanoic thioanhydride, lauric thioanhydride, octadecanoic thioanhydride, benzoic anhydride, 3,5-tert.butyl benzoic thioanhydride, thiolauric anhydride, thiostearic anhydride and thiobenzoic anhydride.

SULFIDES

Dilauryl sulfide, distearyl sulfide, diphenyl sulfide, dibenzyl sulfide, di-p-butyl phenyl sulfide, diphenyl disulfide, distearyl disulfide and tetrathiobis (isooctyl acetate).

The organic soaps and phenates of barium, cadmium and zinc are also suitable for practicing the present invention as well as the ester of β-aminocrotonic acid.

Examples of these compounds include barium laurate, cadmium laurate, zinc laurate, barium stearate, cadmium stearate, zinc stearate, ethylene glycol bis-β-aminocrotonate and thiodiethylene glycol bis-β-aminocrotonate.

This invention does not reside in the selection of the particular stablizer used and the compounds listed above are intended to be exemplary. These skilled in the art are able to determine the particular stabilizer, or stabilizers most suitable for a particular resin formulation and use. After the selection of the desired stabilizer, the present invention is applied by combining therewith a synthetic silicate powder.

Silicates, alone, have no stabilizing properties. However, the amount of synthetic silicates in the stabilizing combination generally does not affect performance. The silicate stabilizer ratio may vary from about 9:1 to about 1:9 and preferably from 3:1 to 1:3 without deleterious effects on the stability of the mixture. The recommended level of the stabilizer admixtures of the present invention is from about 0.01 to 10 weight percent based on the resin, and preferred range is from about 1 to 5.0 weight percent.

Example I

One hundred parts of Geon 103 EP, a general purpose polyvinyl chloride suspension resin was stabilized with one part of a 3:1 mixture of di-n-butyltin bis (isooctyl mercaptoacetate) and a synthetic silicate powder consisting of 54.3% $SiO$, 25.1% $CaO$, 3.6% $Al_2O_3$, 1.2% $Fe_2O_3$, 0.5% $MgO$, 1.3% $Na_2O+K_2O$ and 14% volatile matters. Sixty grams of this formulation was processed on a torque rheometer manufactured by the Brabender Co., at 200° C. and 50 r.p.m. and its rheological behavior was compared to that of a similar formulation stabilized with 0.75 part of di-n-butyltin bis (isooctyl mercaptoacetate) dispersed in its liquid form into the resin.

The operation was repeated with the identical formulation stabilized with one part of respectively, di-n-butyltin azelate, di-n-octyltin bis (isooctyl maleate) and poly (di-n-butyltin maleate) as 3:1 mixtures with the mixed silicates described above. The performance was then compared to similar formulations stabilized with 0.75 part of the respective stabilizers dispersed in their liquid or molten form onto the resin.

Table I presents the observed values with the percentages being based upon the polyvinyl chloride resin. Test numbers 1, 2, 4, 6, and 8 are not according to the present invention and are presented for comparison purposes only.

TABLE I

| Test No. | Stabilizer Compound | Percent | Percent silicate | Fusion in minutes | Stability in minutes |
|---|---|---|---|---|---|
| 1 |  |  |  | 1.0 | Cannot be processed |
| 2 | Di-n-butyltin bis (isooctylmercapto acetate) | 0.75 |  | 0.4 | 6.4 |
| 3* | do | 0.75 | 0.25 | 0.4 | 7.0 |
| 4 | Di-n-butyltin azelate | 0.75 |  | 0.6 | 6.4 |
| 5* | do | 0.75 | 0.25 | 0.4 | 8.2 |
| 6 | Di-n-octyltin bis (isooctylmaleate) | 0.75 |  | 0.6 | 5.8 |
| 7* | do | 0.75 | 0.25 | 0.4 | 6.1 |
| 8 | Poly (di-n-butyltin maleate) | 0.75 |  | 1.0 | 6.4 |
| 9* | do | 0.75 | 0.25 | 0.7 | 7.5 |

*Denotes formulation according to the present invention.

Following the procedure described above except using diatomaceous earth having a particle size of about 50 microns, the resin formulations showed substantially the same stability as those containing no diatomaceous earth.

Example II

A formulation and a procedure similar to those of Example I were used for the evaluation of organic stabilizers. The torque rheometer was operated at 200° C. and 50 r.p.m. for a load of 60 g. of formulation. Formulations of 100 parts of Geon 103 EP were stabilized with 1.0 part of respectively dilaurylcyclohexylidene-1,1-bis-mercaptopropionate, thiollauric anhydride and thiodiethylene glycol - bis-(β-aminocrotonate) finely dispersed as a 3:1 mixture on a synthetic silicate powder containing 52.9% $SiO_2$, 22.6% CaO, 3.6% $Al_2O_3$, 1.2% $Fe_2O_3$, 0.4% MgO, 1.3% $Na_2O+K_2O$ and 18% volatile matters. The operation was repeated with the same formulations stabilized with 0.75 part of the three respective organic stabilizers directly blended onto the resin.

The results are summarized in Table II.

TABLE II

| Test No. | Stabilizer Compound | Percent | Silicate, percent | Fusion in mins. | Stability in mins. |
| --- | --- | --- | --- | --- | --- |
| 1 | Dilaurylcyclohexylidene-1,1-bis(mercaptopropionate). | 0.75 | | 0.6 | 4.6 |
| 2 | do | 0.75 | 0.25 | 0.6 | 6.0 |
| 3 | Thiolauric anhydride | 0.75 | | 0.5 | 5.2 |
| 4 | do | 0.75 | 0.25 | 0.4 | 6.2 |
| 5 | Thiodiethylene glycol bis (β-aminocrotonate). | 0.75 | | 0.3 | 3.5 |
| 6 | do | 0.75 | 0.25 | 0.5 | 4.1 |

Example III

A formulation consisting of 100 parts of Geon 103 EP polyvinyl chloride resin and 10 parts of titanium dioxide pigment was stabilized with 1.0 part of a mixed barium-cadmium soap containing 2.5% Ba and 3.4% Cd finely suspended on the synthetic mixed silicates of Example I. The general testing procedure of the preceding examples was used and the performance of the formulation supra was compared to that of an identical formulation stabilized with 0.75 part of the barium-cadmium soap alone, blended directly onto the resin. Finally, 0.75 part of the barium-cadmium stabilizer and 0.25 part of the silicate were added separately to the formulation in order to demonstrate the necessity of blending the stabilizer with the silicate before mixing with the resins. The results are summarized in Table III.

TABLE III

| Stabilizer | Parts per 100 parts of resin | Fusion in mins. | Stability in mins. |
| --- | --- | --- | --- |
| Barium-cadmium soap | 0.75 | 0.4 | 2.4 |
| Barium-cadmium soap blend with Silicates (3:1 ratio) | ¹ 1.0 | 0.6 | 3.8 |
| Barium-cadmium soap | 0.75 | 0.4 | 2.4 |
| Silicates (introduced separately) | 0.25 | 0.4 | 2.4 |

¹ Total.

Example IV

Following the procedure of Example I, the ratio of the stabilizer to the silicate was varied for the formulation using di-n-butyltin azelate. The results observed are repeated in Table IV.

TABLE IV

| Test No. | Stabilizer Compound | Percent | Silicate, percent | Fusion in mins. | Stability in mins. |
| --- | --- | --- | --- | --- | --- |
| 1 | Di-n-butyltin azelate | 0.75 | 6.75 | 0.4 | 8.1 |
| 2 | do | 0.75 | 0.25 | 0.4 | 8.2 |
| 3 | do | 0.72 | 0.08 | 0.6 | 6.5 |
| 4 | do | 0.75 | | 0.6 | 6.4 |

Example V

The formulation and general procedure of Example I were used to determine the influence of varying amounts of synthetic silicates on the stabilizing activity of the combination.

The ratio, stabilizer/silicates, was varied from 3:1 to 1:3 for all of the stabilizers of Tables I, II and III and in all cases the stability characteristics were found to be better than the formulation containing the respective stabilizer without the silicate and were substantially unchanged by the modification.

Example VI

Using the procedure of Example I, formulations stabilized with stabilizer-silicate blends identified in Table V exhibit improved stability over comparative formulations using the respective stabilizer absent the silicate.

TABLE V

| Stabilizer | Parts per 100 parts of resin | Fusion in mins. | Stability in mins. |
| --- | --- | --- | --- |
| Di-n-butyltin azelate on silicates 1:9 | 7.5 | 0.4 | 8.1 |
| Do | 0.8 | 0.6 | 6.5 |

Examples VII–LIV

Following the procedure and using the synthetic silicate powder of Example I, polyvinyl chloride polymers have improved stability, when stabilized with an admixture of the synthetic silicate powder and any of the stabilizers listed below in comparison to the stability provided by the stabilizer alone or not mixed with the synthetic silicate prior to blending with the resin. The ratio of silicate to stabilizer in the admixture was 1:3 unless noted otherwise and, except as noted, the polymer was a polyvinyl chloride homopolymer.

TABLE VI

| Example | Stabilizer name | Weight percent of resin |
| --- | --- | --- |
| VII | Methyl stannoic acid | 2.5 |
| VIII* | Butyl stannoic acid | 2.5 |
| | Isooctyl thiostannoic acid | 2 |
| IX | Condensation product of 2 parts butyl stannoic acid and 1 part butyl thiostannoic acid. | 1.5 |
| X** | Butyl thiostannoic acid | 2 |
| XI | Phenyl stannoic acid | 3 |
| XII | Diisooctyltin oxide | 5 |
| XIII | Bis(tributyltin) oxide | 5 |
| XIV | Bis(tricyclohexyltin)sulfide | 3 |
| XV | Phenyltin tris (laurate) | 2 |
| XVI | Cyclohexyltin tris(phenylate) | 2 |
| XVII | Dimethyltin bis(propylate) | 2 |
| XVIII | Dioctyltin bis(octadecylate) | 2 |
| XIX | Tributyltin benzoate | 3 |
| XX | Trioctyltin laurate | 2 |
| XXI | Butyltin tris(thiopropylate) | 2 |
| XXII | Dicyclohexyltin bis(thiooctylate) | 2 |
| XXIII | Triallyltin thiophenylate | 2 |
| XXIV | Methyltin tris octadecylate | 2 |
| XXV | Octyltin tris (monobutylmalonate) | 2 |
| XXVI | Diphenyltin bis(propionate) | 4 |
| XXVII | Didecyltin bis(valerate) | 5 |
| XXVIII* | Dioctyltin bis(octadecanoate) | 3 |
| XXIX | Dibutyltin bis (monoisooctyl succinate) | 2 |
| XXX | Diisooctyltin oxalate | 2 |
| XXXI** | Dibutyltin maleate | 2 |
| XXXII | Dibutyltin azelate | 2.5 |
| XXXIII | Dioctyltin adipate | 2.5 |
| XXXIV | Trioctyltin propionate | 3 |
| XXXV | Triallyltin laurate | 3 |
| XXXVI | Trioctyltin benzoate | 2 |
| XXXVII | Tributyltin monobutylfummarate | 2 |
| XXXVIII | Bis(triisooctyltin) gluarate | |
| XXXIX | Methyltin tris (isooctylmercaptopropionate) | 2 |
| XL | Butyltin tris (isooctylmercaptopropionate) | 1.5 |
| XLI | Diisooctyltin bis (isooctylmercaptoacetate) | |
| XLII | Dioctyltin bis (octadecylmercaptopropionate) | 3 |
| XLIII | Tributyltin isooctyl cyclohexylidene-1,1-bis (mercaptopropionate). | 2 |
| XLIV | Lauryl methylstannoate | 3 |
| XLV | Octadecyl butylstannoate | 3 |
| XLVI | Lauryl butylthiostannoate | 3 |
| XLVII | Octyl octylthiostannoate | 2 |
| XLVIII | Lauryl disulfide | 2 |
| XLIX | Dodecyl mercaptan | 3 |
| L | Benzyltin tris laurylmercaptide | 2 |
| LI | Diisooctyltin bis dodecylmercaptide | 2 |
| LII | Trioctyltin octylmercaptide | 2 |
| LIII | Dilauryl thiodipropionate | 2 |
| LIV | Dodecyl ester of 3-octyl mercapto propionic acid. | 2 |

*Denotes ratio mixture of 1:1.
**Denotes ratio mixture of 3:1.

What is claimed is:

1. A composition of matter for stabilizing a halogen-containing resin comprising a liquid stabilizer for said resin and a highly absorbtive synthetic silicate powder in a weight ratio of about 9:1 to 1:9, said synthetic silicate powder having a composition of about 40–70% silica ($SiO_2$), 1 to 30% lime (CaO), 1 to 5% alumina ($Al_2O_3$), 1 to 2% iron oxide ($Fe_2O_3$), 0.1 to 20% magnesia (MgO), 1 to 2% alkalies ($Na_2O—K_2O$) and 10 to 20% volatile matter.

2. The composition of claim 1 wherein the stabilizer is selected from the group consisting of sulfur containing organic stabilizers which do not contain tin, tin-containing organic stabilizers, carboxylates and phenates of barium, cadmium and zinc, β-aminocrotonates and mixtures thereof.

3. The composition of claim 2 wherein the stabilizer is a tin-containing stabilizer selected from the group of hydrocarbyl stannoic and thiostannoic acids and esters thereof, mono-, di- and trihydrocarbyltin oxides, mono-, di- and trihydrocarbyltin sulfides, mono-, di- and trihydrocarbyltin alcoholates, mono-, di- and trihydrocarbyltin carboxylates, mono-, di- and trihydrocarbyltin mercaptoacid esters, mono-, di- and trihydrocarbyltin mercaptides and synergistic combinations thereof.

4. The composition of claim 2 wherein the stabilizer is a sulfur-containing stabilizer selected from the group consisting of thiocarboxylates and esters thereof, thioanhydrides and organic sulfides selected from the group consisting of dilauryl sulfide, distearyl sulfide, diphenyl sulfide, dibenzyl sulfide, di-p-butyl phenyl sulfide, diphenyl disulfide, distearyl disulfide and tetrathiobis (isooctyl acetate).

5. The composition of claim 4 wherein the stabilizer is the organic sulfide.

6. The composition of claim 2 wherein the stabilizer is a β-aminocrotonate.

7. The composition of claim 2 wherein the stabilizer is a dialkyltin bis (isooctylmercaptopropionate).

8. The composition of claim 2 wherein the stabilizer is a dialkyltin azelate.

9. The composition of claim 1 wherein the silicate has a composition of about 50–55% $SiO_2$, 20 to 25% CaO, 3 to 4% $Al_2O_3$, 1 to 1.5% $Fe_2O_3$, 0.3 to 0.7% MgO, 1.0 to 1.5% $Na_2O+K_2O$ and 10 to 20% volatile matter.

10. The composition of claim 1 wherein the silicate has a composition of about 54.3% SiO, 25.1% CaO, 3.6% $Al_2O_3$, 1.2% $Fe_2O_3$, 0.5% MgO, 1.3% $Na_2O+K_2O$ and 14% volatile matter.

11. The composition of claim 1 wherein the silicate has a composition of about 52.9% $SiO_2$, 22.6% CaO, 3.6% $Al_2O_3$, 1.2% $Fe_2O_3$, 0.4% MgO, 1.3% $Na_2O+K_2O$ and 18% volatile matter.

References Cited
UNITED STATES PATENTS

| | | | |
|---|---|---|---|
| 3,382,199 | 5/1968 | Scullin | 252—400 |
| 3,036,980 | 5/1962 | Dunham et al. | 252—259.5 |
| 3,287,422 | 11/1966 | Kaplan | 252—449 |
| 3,489,683 | 1/1970 | Malec | 252—400 |
| 3,627,716 | 12/1971 | Cohen | 252—400 |
| 3,502,616 | 3/1970 | Stapfer | 252—400 |
| 3,480,544 | 11/1969 | Hilty | 252—449 |
| 2,773,841 | 12/1956 | Kimberlin et al. | 252—449 |
| 2,742,345 | 4/1956 | Kloepfer et al. | 252—449 |
| 3,001,853 | 9/1961 | Hemstock | 252—449 |

BENJAMIN R. PADGETT, Primary Examiner

I. GLUCK, Assistant Examiner

U.S. Cl. X.R.

252—259.5; 260—45.75 R